(12) United States Patent
Persson

(10) Patent No.: US 6,725,153 B2
(45) Date of Patent: Apr. 20, 2004

(54) SYSTEM AND A METHOD FOR NAVIGATING A VEHICLE

(75) Inventor: Niklas Persson, Linköping (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 10/180,381

(22) Filed: Jun. 26, 2002

(65) Prior Publication Data

US 2004/0002811 A1 Jan. 1, 2004

(51) Int. Cl.[7] ............ G06F 15/50; G01S 13/89; G01S 13/00
(52) U.S. Cl. ............ 701/207; 701/200; 342/120
(58) Field of Search ............ 701/207, 200, 701/223, 208; 342/120, 189, 63, 462, 65, 118, 450; 340/967, 970

(56) References Cited

U.S. PATENT DOCUMENTS

| | | | |
|---|---|---|---|
| 3,213,451 A | | 10/1965 | Alpers ............ 343/17.1 |
| 4,567,483 A | * | 1/1986 | Bateman et al. ............ 340/970 |
| 4,646,244 A | * | 2/1987 | Bateman et al. ............ 364/461 |
| 4,649,389 A | | 3/1987 | Taylor, Jr. et al. ............ 342/123 |
| 4,698,635 A | | 10/1987 | Hilton et al. ............ 342/64 |
| 4,894,659 A | | 1/1990 | Andrews ............ 342/121 |
| 4,910,674 A | * | 3/1990 | Lerche ............ 364/443 |
| 4,922,258 A | * | 5/1990 | Hassenpflug ............ 342/462 |
| 5,331,562 A | * | 7/1994 | McGuffin ............ 364/440 |
| 6,218,980 B1 | * | 4/2001 | Goebel et al. ............ 342/64 |

FOREIGN PATENT DOCUMENTS

EP 0 475 181 A2 3/1992

OTHER PUBLICATIONS

International Search Report dated Jun. 7, 2001 (4 pages).
International Preliminary Examination Report dated Jan. 2, 2002 (3 pages).

* cited by examiner

*Primary Examiner*—Tan Q. Nguyen
*Assistant Examiner*—Dalena Tran
(74) *Attorney, Agent, or Firm*—Carter, DeLuca, Farrell & Schmidt, LLP

(57) ABSTRACT

In a system for navigating a vehicle according to the appearance of the surface region over which it moves there are at least three devices adapted to carry out a position determination of the vehicle according to a predetermined algorithm as well as members adapted to compare the positions determined by the devices and at a substantial deviation of any position from the other positions assume that this is erroneous and form an average of the other positions as the correct position of the vehicle.

20 Claims, 3 Drawing Sheets

SYSTEM AND A METHOD FOR NAVIGATING A VEHICLE

PRIORITY

This application claims priority to a PCT Application filed on Feb. 6, 2001 and assigned Application No. PCT/SE01/00211 which was published on Aug. 16, 2001 and assigned International Publication No. WO 01/59407 A1; the PCT Application claims priority to an application filed in Sweden on Feb. 14, 2000 and assigned Application No. 0000451-5, the contents of both applications are incorporated herein by reference.

BACKGROUND OF THE INVENTION

Field of the Invention and Description of the Related Art

The present invention relates to a system for navigating a vehicle according to the appearance of a surface region over which it moves, which comprises, on board of the vehicle, a radar altimeter adapted to send signals down towards said surface region and analyse signals reflected therefrom for measuring the height over the part of the surface region just passed, a data base with information about the altitude of the surface region within the area in which the vehicle is present and a device having means adapted to compare the altitude of the surface region last measured with the data base information about surface region altitudes within a given uncertainty area and form a measurement shell extending over this area at the distance measured over the surface region and having a predetermined vertical thickness and having a control unit adapted to control this procedure of forming a measurement shell to be repeated for forming new measurement shells and sections between such shells and the previous measurement shell for determining the position of the vehicle to be within the area of the section, which forms a new measurement shell, and to control a restart of said procedure if it is failed to form said section when attempted to, as well as a method according to the preamble of the appended independent method claim.

Such a system may be used for navigating vehicles of the most different types, for example aircrafts, which may comprise all types of airborne vehicles, such as aeroplanes, unmanned flying objects and so on, in which the navigation is carried out according to the appearance of the terrain overflown by the air-craft, but the vehicle may also be constituted by a boat, a submarine or the like, in which the surface region then is the bottom of the water, such as the sea, in which the boat is moving.

However, the particular case of navigating an aeroplane will be discussed in this disclosure hereinafter so as to illuminate, but accordingly not in any way restrict the invention. It is pointed out that even if the radar altimeter measures the height of the aeroplane above the terrain it is understood that the altitude of the terrain is thereby indirectly determined, since the aeroplane through other sensors has information about the altitude thereof above sea level, so that thanks to the measurement of the radar altimeter said comparison of an altitude of the terrain measured with data base information about terrain altitudes may be carried out.

A system of this type may be used for navigating an aircraft during start and landing as well as cruise flight while utilizing the information given by the appearance of the terrain overflown about the position of the aeroplane.

Said device included in the system is already known under the name terrain navigating filter, and this device performs an algorithm when forming a measurement shell in the way defined above. Such a terrain navigating filter has been developed by the applicant and been in use since 1995. Thus, in such a device or terrain navigating filter an assumption about the noise of the radar altimeter is made, which depends on the fact that the measurement may sometimes take place on objects on the ground, such as trees, and a vertical thickness of the measurement shell is for that sake chosen so that independently of such noises it may for certain be said that the aeroplane is within the measurement shell.

Should the noise be larger, there would be a risk for divergency, i.e., that the aeroplane ends up outside the measurement shell. Should such a divergency occur when the aeroplane flies over flat ground or water the device would not "die" but will continue to deliver erroneous position estimations, since there is then no terrain varying making it possible to get the overlap to disappear. A device overestimating the noise of the radar altimeter is normally used for avoiding this problem, but the costs for this overestimation is that the transient time increases and the performance of the device is deteriorated, i.e. the algorithm gets less exact. By such an increase of the thickness of the measurement shell it is for instance said that "the trees are never higher than 50 meters", instead of as earlier 25 meters for example.

SUMMARY OF THE INVENTION

The object of the present invention is to provide a system and a method of the type defined above, which improve the functionality and the robustness of systems and methods of this type already known.

The object according to the invention is obtained by providing such a system with at least three said devices adapted to carry out said position determination of the vehicle and members adapted to compare the positions determined by the devices and upon a substantial deviation of any position from the other assume that this position is erroneous and form an average of the other positions as the correct position of the vehicle.

By using a plurality of devices or terrain navigating filters in this way the risks of an occurrence of a fault in the position indication gets considerably smaller than when using only one device. Since the aeroplane, in the case of a vehicle in the form of an aeroplane, is only located in one position at a given point of time it may be said that there is only one true position and infinitely many erroneous positions at a given point of time. This means that if a device makes a position determination coinciding with position determinations of other devices these devices have to give correct estimations of the position of the aeroplane, since the probability of the same erroneous position determination of several devices is infinitely low.

According to a preferred embodiment of the invention, the control units of the different devices are adapted to co-operate for reducing the mutual dependency of the position determinations of the devices. This constitutes a very preferred embodiment of the invention, since a high degree of independency of the different devices with respect to each other considerably reduces the risk of two devices indicating the same erroneous position.

A reduction of said dependency may in another preferred embodiment of the invention take place by arranging said means of at least one device to form a measurement shell having a thickness differing from the measurement shell thicknesses of the means of at least another device. By varying adjustments of the noise of the radar altimeter in this way it gets possible to determine whether any device indicates an erroneous position value after running through said procedure as a consequence of a too thin, or too thick, measurement shell, so that the position indication gets inexact.

According to another preferred embodiment of the invention, the different devices are adapted to start said procedure at a time delay with respect to each other, which makes it possible to maintain the robustness also over a terrain having small variations, such as in the aeroplane case travelling over agricultural land or a body of water.

According to another preferred embodiment of the invention, the radar altimeter is adapted to carry out measurements more often than the respective device is adapted to form a new measurement shell, and the respective device is adapted to utilize results from other altitude measurements of the radar altimeter than the other devices. By the fact that the different devices in this way utilize different altitude measurements for the position determination thereof the risk of a repeated error as a consequence of any unusually large obstacle when measuring the terrain is extremely low.

Additional advantages as well as advantageous features of the invention are evident from the following description and the other dependent claims.

BRIEF DESCRIPTION OF THE DRAWINGS

With reference to the appended drawings, below follows a description of a system and a method for navigating an aeroplane according to a preferred embodiment of the invention cited as an example.

DETAILED DESCRIPTION OF A PREFERRED EMBODIMENT

The construction and the function of the system for navigating an aircraft according to the appearance of the terrain overflown thereby according to the invention will now firstly be explained with reference made to FIGS. 1–3 in parallel with FIG. 7.

Figure 2:
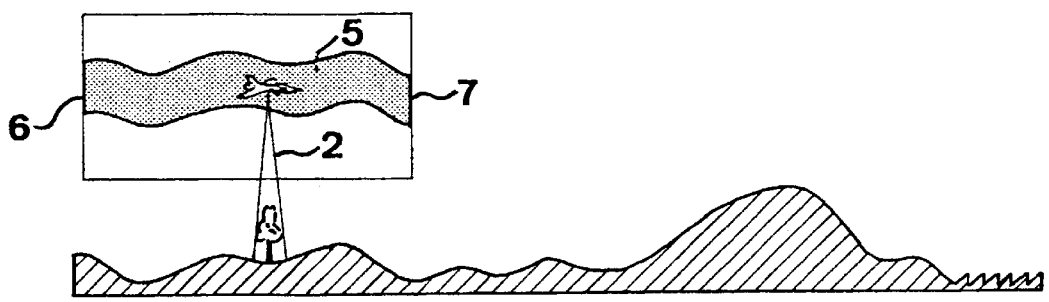
FIG. 2 is a view corresponding to FIG. 1 in a later stage of said procedure.

The aeroplane 1 is provided with a radar altimeter 2 schematically indicated in FIG. 2 through a measurement cone and adapted to send signals down towards the terrain and analyse signals reflected thereby for measuring the altitude of the terrain just passed. The aeroplane has also a data base with information about altitudes of the terrain within the area in which the aeroplane is present, in which this area could be very large, and the data base could contain information about the appearance of the terrain of for example a whole country, such as Sweden, or for the entire earth surface. Terrain information is present in the form of altitude indications for certain fixed points in the terrain, between which the altitude may only be interpolated.

Figure 7:
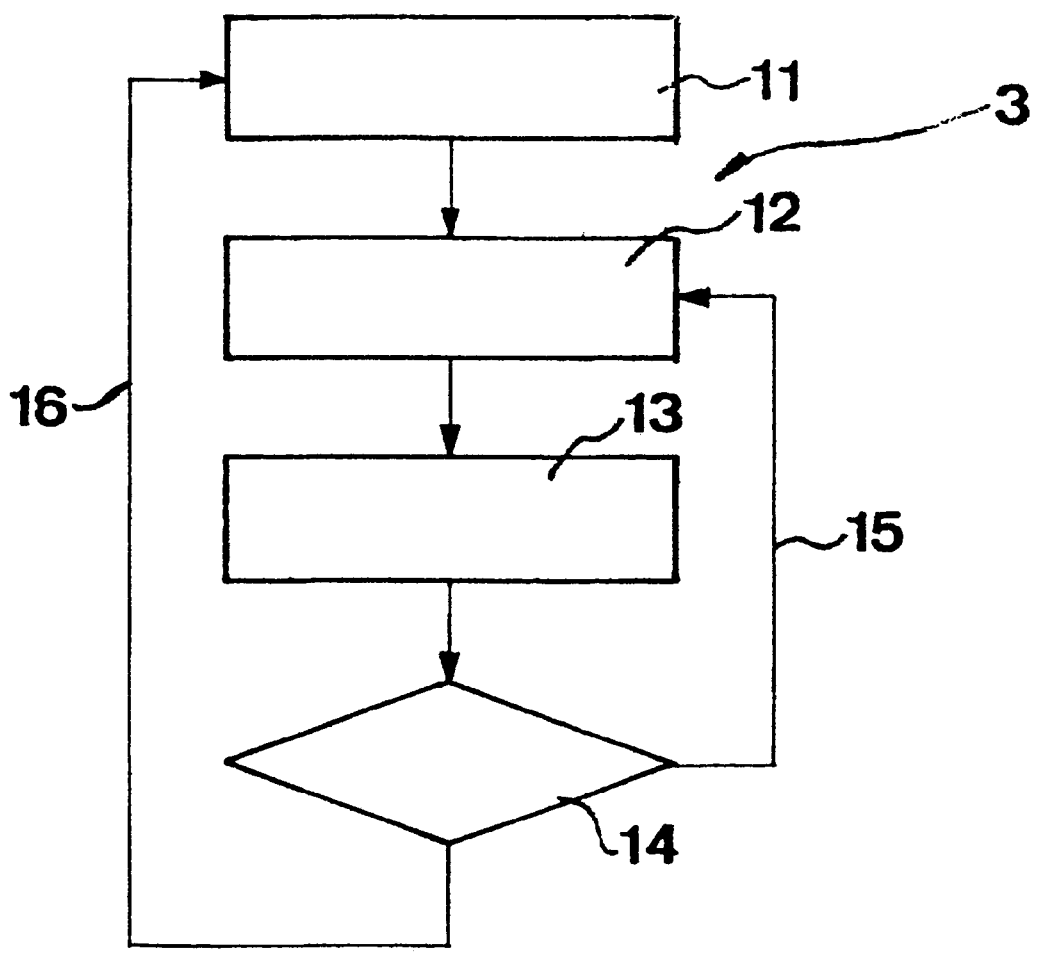
FIG. 7 is a simplified block diagram illustrating the algorithm according to which a device for terrain navigation included in the system according to the invention is adapted to function.

The system also comprises a device 3 for position determination of the aeroplane, the operation algorithm of which is schematically represented in FIG. 7. This device, which may be called terrain navigating filter, is adapted to operate in the following way: When the aeroplane is located in a position within a given uncertainty area and the position determination procedure is to be started a circle cylindrical measurement shell 4 is formed, which looks like a giant icehockey puck and in which the aeroplane certainly is located. This measurement shell 4 may have a radius of typically 10 km and the vertical thickness thereof may for example be 200 m. Thus, the Figures are not drawn to scale, but the Figures are only used to explain the invention in a simple way.

We now assume that the radar altimeter 2 carries out an altitude measurement at a certain time $t_1$, which gives a value of the distance in the vertical direction between the aeroplane and the part of the terrain for which the measurement is carried out, which could be the ground, and the measurement result is then only provided with an error emanating from the measurement method itself, but the measurement may also have been done on for example the top of a tree, and an error depending on the terrain is then introduced, since it has not been measured on the ground. The device comprises means adapted to compare the altitude measured of the terrain with data base information about terrain altitudes within a given uncertainty area and form a measurement shell 5 extending over this area at the measured distance above the terrain and having a predetermined vertical thickness. For the vertical position of the aeroplane this extends within the lateral limits 6, 7 between a lower limit $S_d$ and an upper limit $S_u$ of the measurement shell defined as follows:

$$S_s(X,Y) = h_{top}(X,Y) + h_{ter} - \epsilon$$

$$S_u(X,Y) = h_{top}(X,Y) + h_{ter} + \epsilon + N$$

$h_{top}(X,Y)$ is the altitude information of the data base in the position X,Y, $h_{ter}$ is the height over the terrain measured by the radar altimeter, $\epsilon$ is the largest expected measurement fault as a consequence of the measurement method and N is the largest expected measurement fault depending upon the terrain and the vegetation.

Thus, knowledge is now gained of the fact that the aeroplane is both within the uncertainty area 4 and within the measurement shell 5, i.e. the section between the uncertainty area 4 and the measurement shell. This means that the measurement shell 5 is now the new uncertainty area when the aeroplane flies further according to FIG. 3. The measurement shell is then moved according to an estimation of the movement of the aeroplane through any moving sensor not shown to the time $t_2$ for the next radar altitude measurement. However, the measurement is influenced by the movement of the aeroplane by a certain uncertainty with respect to the velocity, so that the measurement shell or the uncertainty area has to be expanded somewhat in all directions according to the uncertainty of the velocity.

Figure 3:
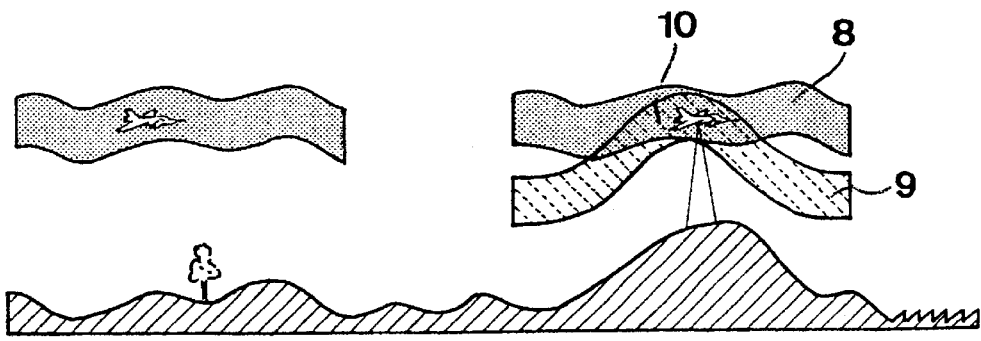
FIG. 3 is a view corresponding to FIGS. 1 and 2 in a still later stage of said procedure.

The uncertainty region moved and somewhat expanded is indicated in FIG. 3 by 8. At this time $t_2$ a new radar altitude measurement is accordingly carried out, which after the comparison described above with data base information results in a new measurement shell 9, and the section 10 between the uncertainty area 8 and the measurement shell 9 gives a new uncertainty area 10, which shows that the uncertainty of the position of the aeroplane has been reduced drastically. This procedure of time and measurement updates is continued and the positioning determination gets better gradually. Accordingly, a time update expands the uncertainty area, while an altitude measurement update contracts the uncertainty area, should there be characteristic terrain variations upon which the measurement has taken place. An altitude measurement update will not provide any new information if the ground is flat. Thus, the navigation is very dependent upon variations of the underlying terrain.

Figure 1:
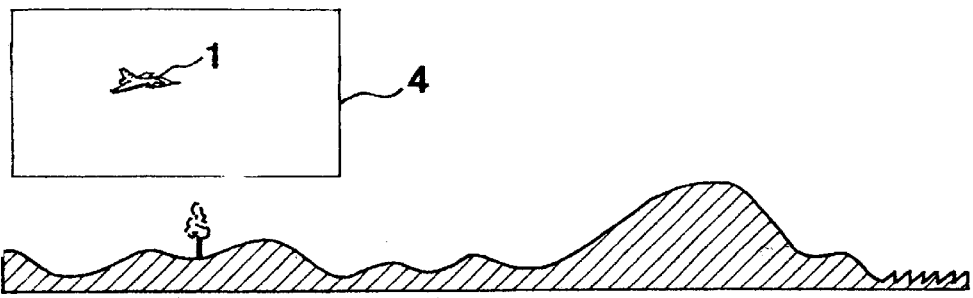
FIG. 1 is a schematic view illustrating an aeroplane flying over a terrain portion and provided with a system for navigation according to the invention in a first stage of a position determination procedure.

For obtaining a high accuracy of the position determination it is necessary to create a small uncertainty area, which may be obtained for example by making the thickness of the measurement shell thinner, but this could then mean that a larger measurement error than the one predicted (N) could occur and then procure an end of the section method, since no section could be formed and thereby a restart of the entire procedure with uncertainty area 4 according to FIG. 1 has to be done. Thus, the choice of N is a compromise between a desire of a small uncertainty area and the risk of getting an empty uncertainty area or section.

The algorithm just described is schematically illustrated in FIG. 7, in which a box 11 illustrates how it is started with a large uncertainty area, a time update expanding the uncertainty area somewhat takes place in box 12, whereupon in box 13 a radar altitude measurement takes place, which forms a measurement shell reducing the uncertainty area. It is shown in box 14 that an attempt is made to form a new section between the measurement shell and the earlier uncertainty area, and if this is succeeded the arrow 15 is followed back to the box 12 for repeating this procedure between the boxes 12 and 14, but if the answer in box 14 is that no section may be formed then the arrow 16 is followed back to the box 11 for restarting the procedure with a large uncertainty area 4 according to FIG. 1.

Figure 4:
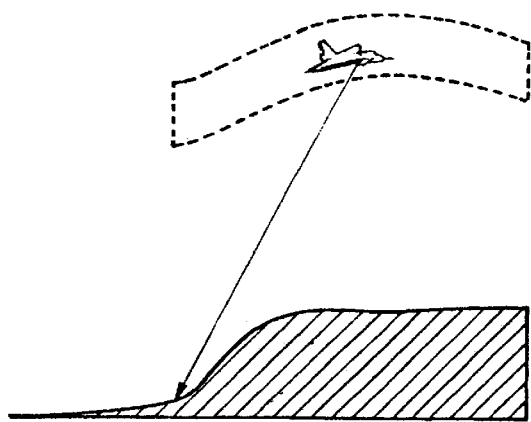
FIGS. 4 and 5 are views similar to the one in FIG. 1 illustrating how different types of terrain may result in measurement faults for a device included in the system according to the invention.
Figure 5:
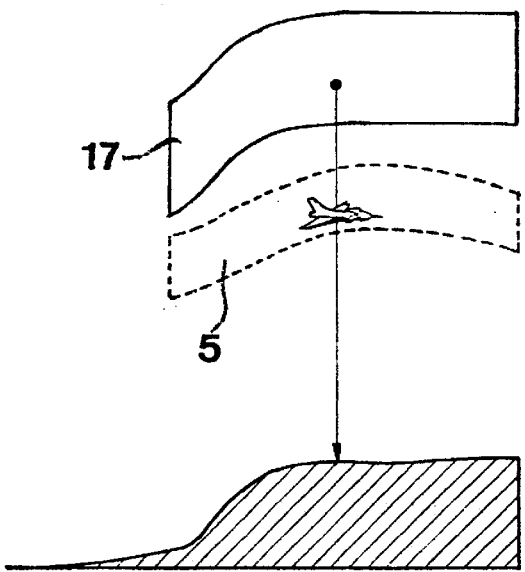
Figure 5:
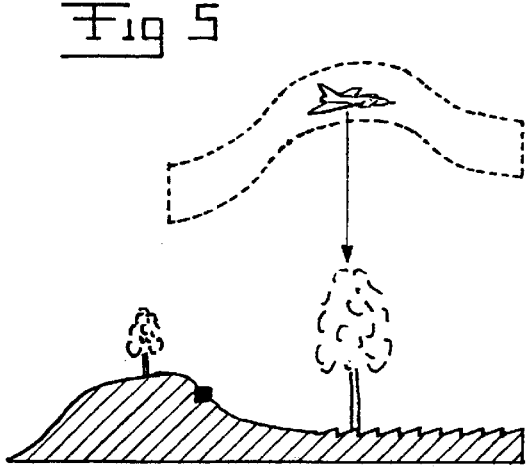

However, in a position determination by a device in the way described above problems may sometimes occur and the device may deliver erroneous values or not have any possibility to deliver values at all during a longer period of time, which is illustrated in FIGS. 4 and 5.

It is shown in FIG. 5 how a "rather" large measurement error, which emanates from the fact that there is a high obstacle on the ground, results in the occurrence of a so called "erroneous fixation", since a section between the preceding uncertainty area 5 and the new one 17 will be formed, but the aeroplane will not be located within this new section 18. Is the aeroplane located over flat ground when this takes place the filter will not die, i.e. a restart of the filter will not take place, but the device will continue to deliver erroneous position determinations or estimations during a long period of time.

Figure 6:
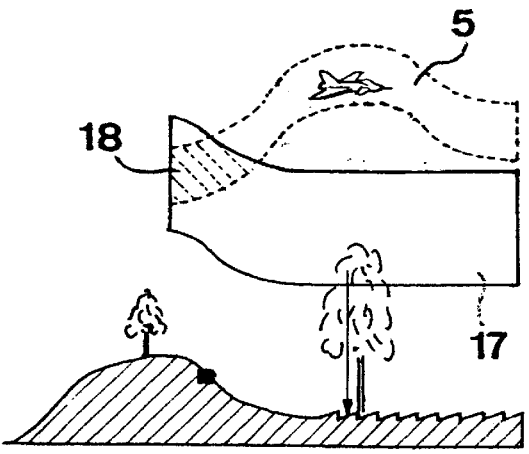
FIG. 6 is a very schematic view illustrating an aspect of the system according to the invention and the method according to the invention.
Figure 6:
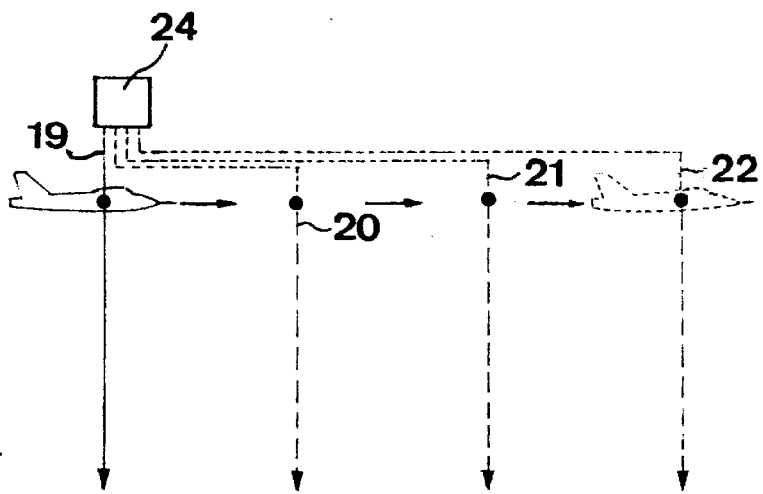

The present invention is characterized by having on board of an aeroplane at least three devices of the type described above, which are adapted to carry out said procedure for position determination of the aeroplane, and these different devices are indicated by a dashed line 19–22 each in FIG. 6. Members 24 are arranged for comparing the positions determined by the devices and upon a substantial deviation of any position from the other assume that this is erroneous and form an average of the other positions as the correct position of the aeroplane. The accuracy of the position determination for the navigation may in this way be improved considerably and the risk of faults may be reduced remarkably, since the probability that a plurality of devices give the same erroneous estimation of the position is infinitely low and therefore substantially equal results of the position determinations of different devices mean in the practice that these determinations are correct. The position determinations of the devices should then be made as far as possible independent of each other. This may be achieved for example by arranging said means of each device to form measurement shells of a thickness differing from the measurement shell thicknesses of the means of the other devices, i.e. the expected noise of the altitude measurements may be varied.

Another possibility consists in the fact that the different devices are started with a time delay with respect to each other, so that for example a new device is not started until the latest started device has formed a new section. Such a terrain dependent time delay results in a maintained robustness even over a terrain having small variations.

Another possibility consists in arranging the radar altimeter to carry out altitude measurements more often than the respective device is adapted to form a new measurement shell, and the respective device is adapted to utilize results from other altitude measurements of the radar altimeter than the other devices. It is already so that the altimeter most often in practice measures a greater number of times than necessary for updating the measurements of the devices, so that this possibility is already available and the invention utilizes this possibility. The measurements are then usually carried out at a frequency of 10–30 Hz, preferably about 15 Hz, which for a normal flight speed of an aeroplane means a distance of about 15 m between such measurements at start and landing. The control units of the respective device are then preferably co-ordinated with each other, so that each utilizes the result of altitude measurements of a determined time interval substantially coinciding with corresponding time intervals of control units of other devices, so that for example a device utilizes measurement results from the measurements 1, 5, 9 . . . in the chronological order, while for another device the corresponding order numbers are 2, 6, 10 . . .

The devices or the filters are advantageously as many as possible, and it is only the capacity of the computer of the aeroplane that sets the limits for how many devices that may be used. At least 5, preferably at least 10 devices are advantageously used in the system.

The invention is of course not in any way restricted to the preferred embodiments described above, but many possibilities to modifications thereof will be apparent to a person with skill in the art without departing from the basic idea of the invention.

It is pointed out that the different devices in the system may in the practice very well be summarized by one single computer program cooperating with the radar altimeter and the data base for performing the algorithm described above for different measurement points associated with the determined imagined device.

"Radar altimeter" is to be given a broad sense and comprises all types of measurements in which a signal is transmitted and reflected by an object or causes a retransmission of any other type of signal for analysis and distance calculation.

The device may as already mentioned be adapted for navigation of other vehicles than aeroplanes according to the appearance of the surface region over which they move, such as airborne vehicles or boats. Accordingly, the medium in which the signals of the radar altimeter are transmitted may be air or water. In the case last mentioned it may also be called echo depth sounder.

What is claimed is:

1. A system for navigating a vehicle according to the appearance of a surface region over which said vehicle moves, said system comprising:

a radar altimeter, onboard of the vehicle, adapted to send signals towards said surface region and analyse signals reflected therefrom for measuring the height over the part of the surface region just passed by said vehicle;

a data base storing information regarding the altitude of the surface region within the area in which the vehicle is present;

a first device comprising:

means for comparing the altitude of the surface region last measured with the data base information about surface region altitudes within a given uncertainty area and performing a procedure for forming a measurement shell extending over this area at the distance measured over the surface region and having a predetermined vertical thickness; and a control unit adapted to repeat said procedure for forming additional measurement shells and sections between a newly formed measurement shell and the previous measurement shell for determining the position of the vehicle to be within an area of a particular section, said control unit further adapted to control a restart of said procedure if said control unit failed to form at least one section between two measurement shells;

at least two other devices as said first device each for making a position determination of said vehicle; and means for comparing the positions determined by the first device and the at least two other devices, wherein upon a substantial deviation of a first determined position from at least two other determined positions then determining that said first determined position is erroneous, and determining a substantially correct position of said vehicle by determining an average position using the at least two other determined positions.

2. A system according to claim 1, wherein the control unit of each of said devices is adapted to co-operate with the other control units for reducing a mutual dependency with respect to the position determination of each of said devices.

3. A system according to claim 1, wherein said means for forming a measurement shell of at least one of said devices is adapted to form measurement shells having a different thickness from the thickness of the measurement shells formed by the other devices.

4. A system according to claim 1, wherein said means for forming a measurement shell of each device is adapted to form measurement shells having a different thickness from the thickness of the measurement shells formed by the other devices.

5. A system according to claim 1, wherein each of said devices is adapted to start said procedure with a predetermined time delay with respect to the other devices.

6. A system according to claim 1, wherein each of said devices is adapted not to start said procedure until a device currently performing said procedure has formed a section.

7. A system according to claim 1, wherein said radar altimeter is adapted to carry out altitude measurements a greater number of times than a particular device is adapted to form a new measurement shell, and wherein the particular device is adapted to utilize results from other altitude measurements of said radar altimeter than the other devices.

8. A system according to claim 7, wherein each control unit is co-ordinated with each other control unit to each utilize the results of altitude measurements at a given time interval substantially coinciding with the corresponding time intervals of the other control units.

9. A system according to claim 1, wherein said radar altimeter is adapted to carry out the measurements thereof at a frequency in the range of 10–30 Hz.

10. A system according to claim 1, wherein said system includes at least five devices.

11. A system according to claim 1, wherein said vehicle is an aircraft and said system is adapted for navigation of said aircraft, wherein said radar altimeter is adapted to send signals down towards said surface region being passed over by the aircraft for measuring the distance of the aircraft from said surface region, and wherein said data base contains information regarding altitudes of said surface region within the area in which the aircraft is flying over.

12. A system according to claim 11, wherein said radar altimeter is adapted to be provided on board of said aircraft for navigation thereof according to the contour of said surface region flown over by said aircraft.

13. A method for navigating a vehicle according to the appearance of a surface region over which said vehicle moves, said system comprising:

sending signals by a radar altimeter, onboard of the vehicle, towards said surface region and analyzing signals reflected therefrom for measuring the height over the part of the surface region just passed by said vehicle;

storing information within a data base regarding the altitude of the surface region within the area in which the vehicle is present;

comparing the altitude of the surface region last measured with the data base information about surface region altitudes within a given uncertainty area;

performing a procedure for forming a measurement shell extending over the uncertainty area at the distance measured over the surface region, the measurement shell having a predetermined vertical thickness;

repeating said procedure for forming additional measurement shells and sections between a newly formed measurement shell and the previous measurement shell for determining the position of the vehicle to be within an area of a particular section;

restarting said procedure if at least one section was not formed between two measurement shells;

making a respective position determination by each of at least three different devices; and comparing the positions determined by the at least three different devices, wherein upon a substantial deviation of a first determined position from at least two other determined positions then determining that said first determined position is erroneous, and determining a substantially correct position of said vehicle by determining an average position using the at least two other determined positions.

14. A method according to claim 13, wherein each of said devices is adapted to co-operate with the other devices for reducing a mutual dependency with respect to the position determination of each of said devices.

15. A method according to claim 14, wherein, for at least one device, measurement shells having a thickness differing from the measurement shell thicknesses of at least another device are formed for reducing said mutual dependency.

16. A method according to claim 13, wherein each of said devices is adapted to start said procedure with a predetermined time delay with respect to the other devices.

17. A method according to claim 13, wherein said radar altimeter is adapted to carry out altitude measurements a greater number of times than a particular device is adapted to form a new measurement shell, and wherein the particular device is adapted to utilize results from other altitude measurements of said radar altimeter than the other devices.

18. A method according to claim 13, wherein said vehicle is an aircraft and said method is used for navigating said aircraft, wherein said radar altimeter is adapted to send signals down towards said surface region being passed over by the aircraft for measuring the distance of the aircraft from said surface region, and wherein said data base contains information regarding altitudes of said surface region within the area in which the aircraft is flying over.

19. A method according to claim 18, wherein said method navigates said aircraft according to the contour of said surface region flown over by said aircraft.

20. A system for navigating a vehicle according to the appearance of a surface region over which said vehicle moves, said system comprising:
 a radar altimeter, onboard of the vehicle, adapted to send signals towards said surface region and analyse signals reflected therefrom for measuring the height over the part of the surface region just passed by said vehicle, said surface region corresponding to terrain which may be substantially flat, hilly/mountainous, urban, forested, or any combination of terrain;
 a data base storing information regarding the altitude of the surface region within the area in which the vehicle is present;
 a first device comprising:
  means for creating an initial uncertainty area having a predefined height (i.e. thickness) and radius within which the vehicle is definitely located;
  means for comparing the altitude of the surface region last measured with the data base information about surface region altitudes within the uncertainty area and performing a procedure for forming a measurement shell extending over this area at the distance measured over the surface region and having a predetermined vertical thickness, the measurement shell is dimensioned to envelope the vehicle; and
 a control unit adapted to repeat said procedure for forming additional measurement shells and sections defined by intersection of a newly formed measurement shell and the previous measurement shell for determining the position of the vehicle to be within an area of the section, said control unit further adapted to control a restart of said procedure including creation of a new initial uncertainty area if the control unit fails to form at least one section defined by intersection of two measurement shells;
 at least two other devices as said first device each for making a position determination of said vehicle; and
 means for comparing the positions determined by the first device and the at least two other devices, wherein upon a substantial deviation of a first determined position from at least two other determined positions then determining that said first determined position is erroneous, and determining a substantially correct position of said vehicle by determining an average position using the at least two other determined positions.

* * * * *

UNITED STATES PATENT AND TRADEMARK OFFICE
CERTIFICATE OF CORRECTION

PATENT NO. : 6,725,153 B2 Page 1 of 1
DATED : April 20, 2004
INVENTOR(S) : Niklas Persson It is certified that error appears in the above-identified patent and that said Letters Patent is hereby corrected as shown below:

<u>Title page,</u>
Insert Item -- [30] Foreign Application Priority Data
   Feb. 14, 20200 (SE) ......................................................0000451-5
   Feb. 6, 2001 (WO) .............................................PCT SE0100211 --

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,725,153 B2
DATED : April 20, 2004
INVENTOR(S) : Niklas Persson

It is certified that error appears in the above-identified patent and that said Letters Patent is hereby corrected as shown below:

Title page,
Insert Item -- [30] Foreign Application Priority Data
   Feb. 14, 2000 (SE) ......................................................0000451-5
   Feb. 6, 2001 (WO) ............................................PCT SE0100211 --

This certificate supersedes Certificate of Correction issued August 10, 2004.

Signed and Sealed this

Nineteenth Day of October, 2004

JON W. DUDAS
*Director of the United States Patent and Trademark Office*